United States Patent [19]

Aoki et al.

[11] Patent Number: 5,423,977
[45] Date of Patent: Jun. 13, 1995

[54] ROTARY FILTER WITH AUTOMATIC SPRAY CLEANING DEVICE FOR CLEANING SAME

[75] Inventors: Seijiro Aoki, Kawagoe; Yuichi Takahashi, Utsunomiya, both of Japan

[73] Assignees: Nippon Yusen Kaisha; Fuji Filter Mfg. Co., Ltd., both of Tokyo, Japan

[21] Appl. No.: 94,267

[22] Filed: Jul. 21, 1993

[30] Foreign Application Priority Data

Aug. 6, 1992 [JP] Japan .................. 4-229493

[51] Int. Cl.⁶ .............................................. B01D 33/48
[52] U.S. Cl. ................................. 210/107; 210/137; 210/142; 210/143; 210/391; 210/398; 210/402; 210/409
[58] Field of Search ............ 210/107, 391, 402, 409, 210/784, 791, 106, 741, 137, 143, 142; 162/277; 55/230, 231, 294

[56] References Cited

U.S. PATENT DOCUMENTS

| | | | |
|---|---|---|---|
| 1,554,943 | 9/1925 | Antoine | 210/391 |
| 3,647,071 | 3/1972 | Lamort | 210/107 |
| 3,675,772 | 7/1972 | Zhukovsky et al. | 210/106 |
| 4,941,971 | 7/1990 | Albright | 210/107 |

FOREIGN PATENT DOCUMENTS

| | | | |
|---|---|---|---|
| 70791 | 4/1983 | Japan | 162/277 |
| 2019216 | 1/1987 | Japan | 210/391 |

*Primary Examiner*—Matthew O. Savage
*Attorney, Agent, or Firm*—Longacre & White

[57] ABSTRACT

A continuous filtration device comprising a cylindrical filter rotationally driven around the axis thereof, a filtration tank in which an outer chamber having an inlet for a liquid to be cleaned and an inner chamber having an exit for a liquid filtrate are separated by the filter, a cleaning means disposed in the outer chamber for spraying a cleaning liquid at high pressure at an acute angle to a surface of a filter to be cleaned, and a guide plate disposed at a position on the side opposite to the cleaning means with respect to the surface to be cleaned for guiding obstacles removed by cleaning and detaching them from the filter. The filter can be automatically cleaned by spraying a liquid to be filtered, liquid filtrate or similar other liquid to the surface of the contaminated filter. The device is useful, for example, for filtration of marine fuel oils or lubricants.

4 Claims, 4 Drawing Sheets

ROTARY FILTER WITH AUTOMATIC SPRAY CLEANING DEVICE FOR CLEANING SAME

BACKGROUND OF THE INVENTION

1. Field of the Invention

The present invention concerns a continuous filtration device for filtration of various kinds of liquids to be filtered and, more particularly, it relates to a continuous filtration device which is suitably applied to the filtration of marine fuel oils or lubricants.

2. Description of the Prior Art

Generally, in marine vessels, since fuel oils from an oil tank are filtered in a filtration device and then supplied to an internal combustion engine, filters in the filtration device have to be cleaned periodically or continuously.

By the way, in most of filters for marine vessel fuel oils, a cleaning method by a backwash system that utilizes an inner pressure of a system (4 to 6 kg/cm$^2$ in a primary system and 10 to 14 kg/cm$^2$ in a secondary system) has been adopted so far.

Since the conventional filter cleaning method as described above utilizes the inner pressure of the system, there is a problem that a passing rate of a liquid obtainable at the passing surface on the opposite side of the filter is only at such a rate as a backwashing liquid exudes and, accordingly, that no effective regeneration effect can be expected by cleaning.

In view of the above, crews conduct frequent cleaning while opening the filtration device. However, since there are no adequate equipments in the vessel and the cleaning operation has to be completed within a restricted period of time, complete cleaning is difficult even if the crews conduct cleaning by using solvents, steams or high pressure water. Then, there is a problem that the device has to be landed in order to trust regeneration of the device to expert traders or replace it with new one.

OBJECT OF THE INVENTION

The present invention has been achieved in view of the foregoing present situations and it is an object thereof to provide a continuous filtration device capable of greatly decreasing the number of times for the cleaning operation conducted by crews while opening the filtration device.

Another object of the present invention is to provide a continuous filtration device capable of improving the cleaning efficiency, suppressing the reduction of the filtration accuracy and decreasing the quantity of a cleaning liquid.

A further object of the present invention is to provide a continuous filtration device capable of decreasing the size of a pressurization means for a cleaning liquid and stabilizing the pressure of the cleaning liquid.

A still further object of the present invention is to provide a continuous filtration device capable of more effectively preventing obstacles removed by cleaning from redepositing on a filter.

SUMMARY OF THE INVENTION

The foregoing objects of the present invention can be attained in accordance with the present invention in a continuous filtration device comprising:

a cylindrical filter rotationally driven around the axis thereof, a filtration tank in which an outer chamber having an inlet for a liquid to be cleaned and an inner chamber having an exit for a liquid filtrate are separated by the filter, a cleaning means disposed in the outer chamber for spraying a cleaning liquid at high pressure at an acute angle to a surface of the filter to be cleaned, and a guide plate disposed at a position on the side opposite to the cleaning means with respect to the surface to be cleaned for guiding obstacles removed by cleaning and detaching them from the filter.

In the continuous filtration device according to the present invention, a cleaning liquid at high pressure from the cleaning means is sprayed at an acute angle to the surface of the filter to be cleaned. Therefore, obstacles caught on the surface of the filter are removed like that they are struck down. In this case, since tile filter is under rotation, the surface to be cleaned moves successively in the circumferential direction and, as a result, the entire circumferential surface of the filter can be cleaned.

By the way, it has been confirmed by the experiment made by the present inventors that filtration through the filter is conducted also during cleaning and, accordingly, obstacles removed and whirled up from the filter will be directly redeposited on the filter as they are and no sufficient cleaning effect can be obtained without adequate means.

In the present invention, obstacles removed and whirled up from the filter are guided in the direction of detaching from the filter by the guide plate disposed at a position opposite to the cleaning means with respect to the surface to be cleaned. Therefore, the amount of the obstacles to be redeposited to the filter after removal from the filter is remarkably decreased, to obtain an effective cleaning effect.

In a preferred embodiment of the present invention, the cleaning means is disposed in the cleaning chamber defined by circumferentially partitioning the outer chamber with the guide plate and the partition plate.

In this embodiment, diffusion of the obstacles removed and whirled up from the filter is restricted to the inside of the cleaning chamber, thereby enabling to improve the cleaning efficiency, as well as enabling to suppress the reduction of the filtration accuracy and decrease the amount of the cleaning liquid to be used.

In a further embodiment, the cleaning means comprises a plurality of high pressure spray nozzles each disposed at an optional interval in the axial direction of the filter.

In this embodiment, the entire surface in the axial direction of the filter can be cleaned and, further, when the high pressure spray nozzles are intermittently driven successively along the axial direction of the filter, a sufficient cleaning liquid at high pressure can be obtained even if the size of the pressurization means for the cleaning liquid is made smaller and the pressure of the cleaning liquid can be stabilized.

In a further embodiment, the cleaning means comprises a single high pressure spray nozzle that moves in the axial direction of the filter.

In this embodiment, the entire surface in the axial direction of the filter can be cleaned even by using a single high pressure spray nozzle.

In a further embodiment, the angle made between the cleaning liquid at high pressure sprayed from the cleaning means and the surface to be cleaned is defined as 20 to 60 degree relative to the tangential line at the surface to be cleaned.

In this embodiment, obstacles can be removed most efficiently from the filter.

In a further embodiment, the cleaning means is controlled based on a pressure difference between the pressure of the primary liquid and the pressure of the liquid filtrate.

In this embodiment, the cleaning operation can be automated.

In a further embodiment, at least one of the liquid to be filtered or the liquid filtrate is used as the high pressure cleaning liquid.

In this embodiment, there is no worry at all that the property of the liquid filtrate is changed by cleaning.

In a further embodiment, the guide plate is disposed at an angle of 20 to 60 degree relative to the tangential line at the surface to be cleaned.

In this embodiment, obstacles removed from the filter can be guided smoothly and redeposition to the filter can be prevented more effectively.

BRIEF DESCRIPTION OF THE DRAWINGS

These and other objects and advantages of the present invention may be readily ascertained by referring to the following descriptions and appended drawings wherein.

DESCRIPTION OF PREFERRED EMBODIMENTS

Description will now be made with reference to FIG. 1 through FIG. 3 of the drawings for a first embodiment according to the present invention.

Figure 1:
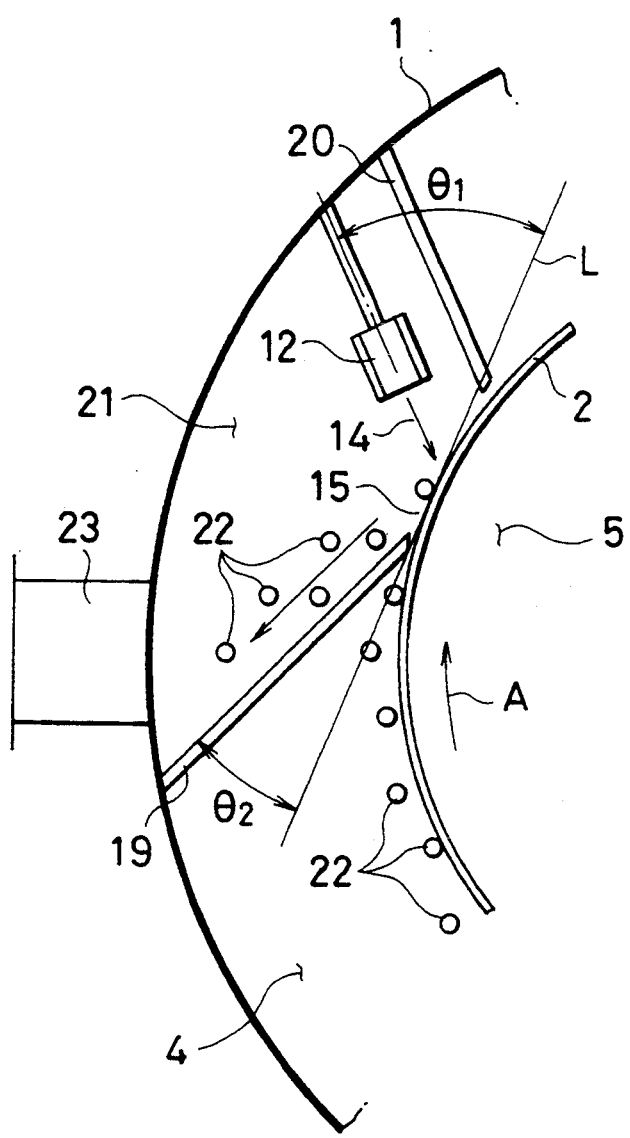
FIG. 1 is a fragmentary cross sectional view showing a continuous filtration device according to a first embodiment of the present invention.
Figure 2:
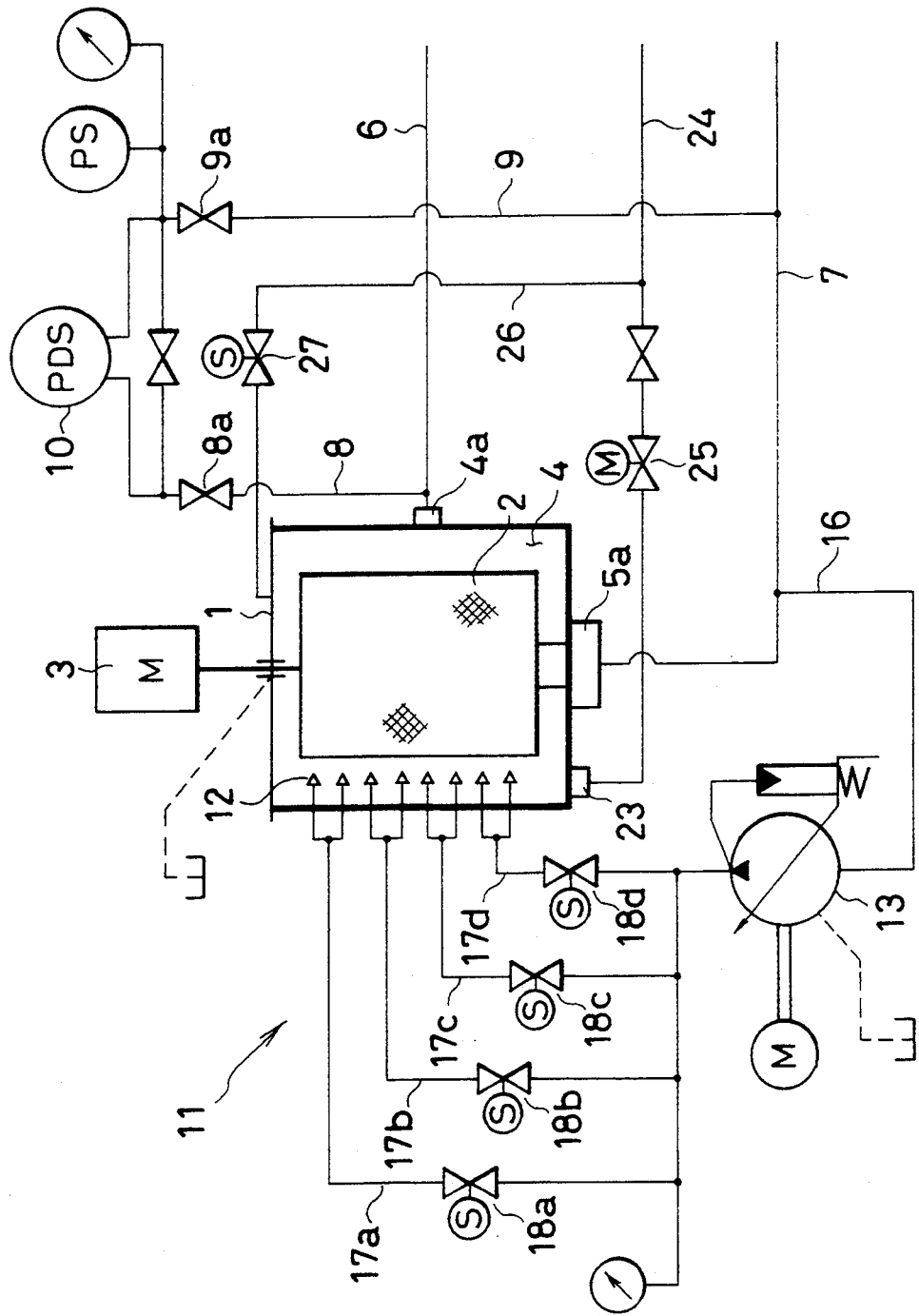
FIG. 2 is an entire diagrammatic view for the device of FIG. 1.
Figure 3:
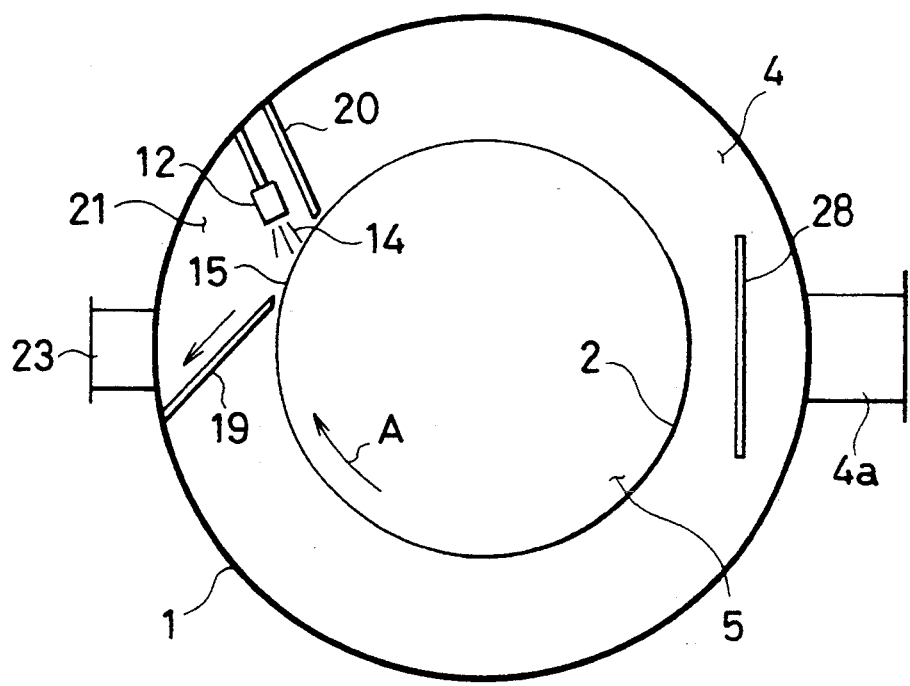
FIG. 3 is a horizontal cross sectional view illustrating the inner structure of a filtration tank shown in FIG. 2.

FIG. 2 shows an example of a continuous filtration device according to the present invention, in which reference numeral 1 denotes a cylindrical filtration tank, and a cylindrical filter 2 closed at upper and lower ends is disposed in the filtration tank 1 as shown in FIG. 1 through FIG. 3. The filter 2 is adapted to be driven rotationally in the direction of an arrow A shown in FIG. 1 and FIG. 3 by a motor 3 mounted on the filtration tank 1. The inside of the filtration tank 1 is separated by the filter 2 into an outer chamber 4 having an inlet 4a for a liquid to be cleaned and an inner chamber 5 having an exit 5a for a liquid filtrate.

The filter 2 is prepared, for example, from a wire mesh laminate made of stainless steel off a five-layered structure comprising a protection wire fabric, a filtration wire fabric, an inner wire fabric and a two-layered reinforcing wire fabric laminated in this order from the outer circumferential side and, further, sintering the laminate, by which a high filtration accuracy and durability can be obtained.

As shown in FIG. 2, a supply pipe 6 for supplying a liquid to be filtered is connected to the inlet 4a of the outer chamber 4, while a discharge pipe for discharging a liquid filtrate is connected to the exit 5a of the inner chamber 5. A pressure difference gage 10 is connected to the supply pipe 6 and the discharge pipe 7 by way of branched pipes 8, 9 having opening/closure valves 8a, 9a, respectively. A cleaning device 11 to be described later is adapted to actuate when a pressure difference between the pressure of the liquid to be filtered and the pressure of the liquid filtrate exceeds a predetermined value.

As shown in FIG. 2, the cleaning device 11 has high pressure spray nozzles 12 disposed, for example, by eight each at a predetermined interval in the axial direction of the filter 2, and the liquid filtrate pressurized by a pressurization pump 13 to about 70–100 kg/cm$^2$ is supplied to each of the high pressure spray nozzles 12. As shown in FIG. 1, each of the high pressure spray nozzles 12 sprays the liquid filtrate at high pressure as a high pressure cleaning liquid 14 so as to clean the surface 15 of the filter 2.

As shown in FIG. 2, the pressurization pump 13 is connected at its inlet by way of a suction pipe 16 to the discharge pipe 7, while the pressurization pump 13 is connected at its exit to four dispensing pipes 17a, 17b, 17c, 17d in parallel. The high pressure spray nozzles 12 are connected each by two in parallel to each of the dispensing pipes 17a, 17b, 17c, 17d.

As shown in FIG. 2, electromagnetic valves 18a, 18b, 18c, 18d are disposed to the dispensing pipes 17a, 17b, 17c, 17d, respectively. The solenoid valves 18a, 18b, 18c, 18d are respectively controlled and opened selectively and successively from the solenoid valve 18a toward the solenoid valve 18d, each for a predetermined period of time via a sequential control means (not shown) when the pressure difference detected by the gage means exceeds a predetermined value. This sequential control is conducted repeatingly. Thus, the high pressure spray nozzles 12 are driven intermittently each in pair from the upper end to the lower end of the filter 2 successively.

As shown in FIG. 1 and FIG. 3, each of the high pressure spray nozzles 12 is disposed within a cleaning chamber 21 formed by circumferentially partitioning the inside of the outer chamber 4 with a guide plate 19 and a partition plate 20. As shown in FIG. 1, the angle $\theta_1$ made between the high pressure cleaning liquid 14 sprayed from each of the high pressure spray nozzles 12 and the filter surface 15 to be cleaned is determined as 20 to 60 degree, more preferably, 30 to 50 degree relative to the tangential line L at the surface 15 to be cleaned. This enables to remove obstacles 22 caught on the filter 2 easily and reliably, and the removed obstacles 22 are guided by the guide plate 19 in the direction detaching from the filter 2 so that their redeposition to the filter 2 can be prevented as much as possible.

As shown in FIG. 1, the angle $\theta_2$ made between the guide plate 19 and the surface 15 to be cleaned is determined as 20 to 60 degree relative to the tangential line L and more preferably, to a value somewhat smaller than the angle $\theta_1$. This enables to guide the obstacles 20 removed from the filter 2 to be guided in the direction smoothly detaching from the filter 2.

The cleaning chamber 21 surrounded with the guide plate 19 and the partition plate 20 may be separated from the outer chamber 4 by closing the upper and the lower ends thereof, for example, with a closing plate or the like. However it is usually opened at such a position as free from the effect of the high pressure cleaning liquid 14 and in communication with the outer chamber 4. Accordingly, the obstacles 22 removed from the filter 2 descend in the cleaning chamber 21, reach the bottom of the filtration tank 1 and are then collected together with other drains that descend in the outer chamber 4 to a drain port 23 disposed at the bottom of the filtration tank 1 as shown in FIG. 2.

As shown in FIG. 2, the drain port 23 is connected with a drain pipe 24 having an electromotive valve 25. An air vent pipe 26 having an air vent valve 27 is connected to the downstream of the electromotive valve 25 of the drain pipe 24.

In FIG. 3, reference numeral 28 denotes a baffle plate.

Descriptions will now be made to the operation of this embodiment.

When marine fuel oils are sent by way of the supply pipe 6 as a liquid to be filtered to the filtration tank 1, the liquid flows from the inlet 4a into the outer chamber 4. In this case, obstacles in the liquid are captured and removed by the filter 2, and the filtrate reaches the inner chamber 5 and sent from the exit 5a by way of the discharge pipe 7 to a internal combustion engine.

By the way, as the obstacles 22 are caught by the filter 2, the flow rate of the liquid filtrate is reduced, so that a pressure difference between the pressure of the liquid to be filtered and the pressure of the liquid filtrate is gradually increased. Then, if the pressure difference exceeds a predetermined value, it is detected by a pressure difference gage 10, and the cleaning device 11 is actuated based on a detection signal.

More specifically, the pressurization pump 13 is at first started and, among the four solenoid valves 18a, 18b, 18c and 18d, the solenoid valve 18a is opened. Then, the liquid filtrate pressurized to about 70-100 kg/cm$^2$ by the pressurization pump 13 is sent by way of the dispensing pipe 17a to a pair of high pressure spray nozzles 12 at the upper end and sprayed as the high pressure cleaning liquid 14 from both of the high pressure spray nozzles 12 to the filter surface 15 to be cleaned.

Since the four solenoid valves 18a, 18b, 18c and 18d are selectively opened successively each for a predetermined period of time in the order of 18a - 18b - 18c - 18d - 18a—, the spray position of the high pressure cleaning liquid 14 displaces from the upper end to the lower end of the filter 2 and then returns from the lower end again to the upper end of the filter 2. Accordingly, the entire surface in the axial direction of the filter 2 is cleaned. Further, since the surface 15 to be cleaned moves circumferentially by the rotation of the filter 2, the entire circumferential surface of the filter 2 can be cleaned consequently.

By the way, the angle $\theta_1$ between the high pressure cleaning liquid 14 sprayed from each of the high pressure spray nozzles 12 and the tangential line L is defined as 20 to 60 degree, more preferably, 30 to 50 degree, while the angle $\theta_2$ between the guide plate 19 and the tangential line L is defined as 20 to 60 degree and, more preferably, to a value somewhat smaller than the angle $\theta_1$. Accordingly, the obstacles 22 caught on the filter 2 are removed from the filter 2 like that they are struck down by the high pressure cleaning liquid 14. The obstacles 22 thus removed and whirled up are guided smoothly by the guide plate 19 in the direction detaching from the filter 2. Therefore, redeposition of the removed obstacles 22 to the filter 2 can be prevented.

Further, since each of the high pressure spray nozzles 12 is disposed in the cleaning chamber 21 surrounded with the guide plate 19 and the partition plate 20, the range of the obstacles 22 whirling up after removal from the filter 2 is limited within the inside of the cleaning chamber 21 and they do not diffuse over the entire area of the outer chamber 4. In addition, the obstacles 22 tend to redeposit most remarkably at the portion cleaned by the high pressure cleaning liquid 14. However since the cleaned portion successively displaces from the cleaning chamber 21 by the rotation of the filter 2, the obstacles 22 can be prevented more effectively from redepositing to the filters.

By the way, when the filter 2 is cleaned, the electro motive valve 25 is opened and, accordingly, a downward stream is formed in the cleaning chamber 21 from the upper end to the lower end thereof. Therefore, obstacles 22 removed and whirled up from the filter 2 descend in the cleaning chamber 21 by the downward stream and collected together with other drains to the drain port 23 at the bottom of the filtration tank 1. Then, they are discharged out of the filtration tank 1 by way of the drain pipe 24.

Since the high pressure spray nozzles 12 are disposed in the cleaning chamber 21, the filter 2 is cleaned with the high pressure cleaning liquid 14, and the removed obstacles 22 are guided by the guide plate 19 in the direction detaching from the filter 2, tile filter 2 can be cleaned sufficiently and the removed obstacles 22 can be prevented from redepositing to the filter 2. Therefore, the number of cleaning (washing) operations conducted manually by crews while opening the filtration device can be decreased significantly and, depending on the case, can be saved utterly.

Figure 4:
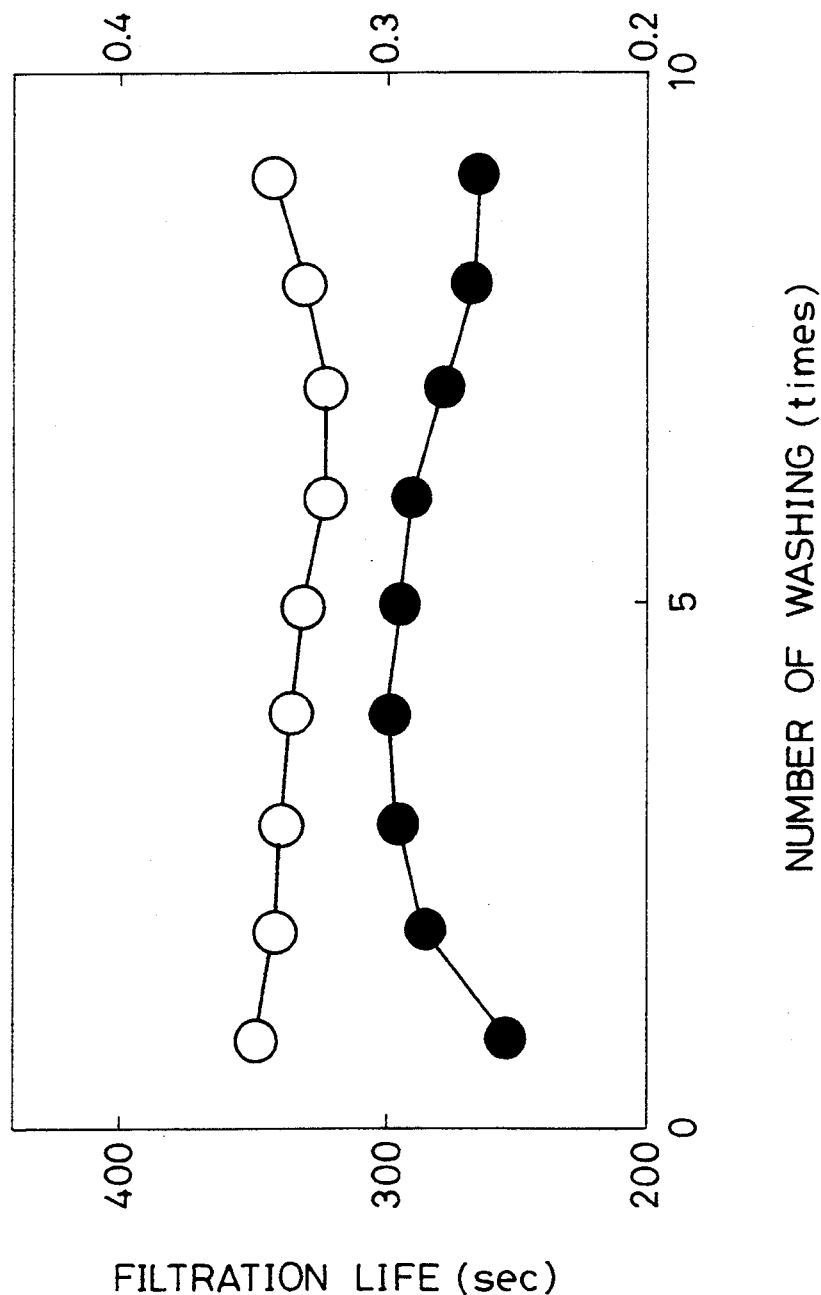
FIG. 4 is a graph illustrating the cleaning effect of the cleaning device of FIG. 2.

For confirming the cleaning effect of the cleaning device 11 in the above-mentioned embodiment, the inventors conducted cleaning experiment for nine times under the following conditions to obtain a result as shown in FIG. 4.

The conditions are as shown below.

| Filtration accuracy | 10 um |
| Operation liquid used | water |
| Contaminants in the liquid | fine SiO$_2$ particles (100 ppm) |
| Cleaning pressure | 80 kg/cm$^2$ |
| Filtrate flow rate | 10.8 l/min |

In FIG. 4, graphic indication by solid dots shows the change of an initial pressure difference (the pressure difference between the pressure of the liquid to be filtered and the pressure of the liquid filtrate just after cleaning), while graphic indication by blank circles shows the life of filtration (duration time from the start of filtration to the instance at which cleaning becomes necessary) and the abscissa indicates the number of times of the washing (cleaning) operation.

As can be seen also from FIG. 4, both the initial pressure difference and the life of filtration show scarce changes even after a number of washing steps, showing that the filter restores its original state substantially completely by cleaning. In other words, it can be seen that continuous filtration for a long period of time is possible without manual cleaning while opening the filtration device.

Figure 5:
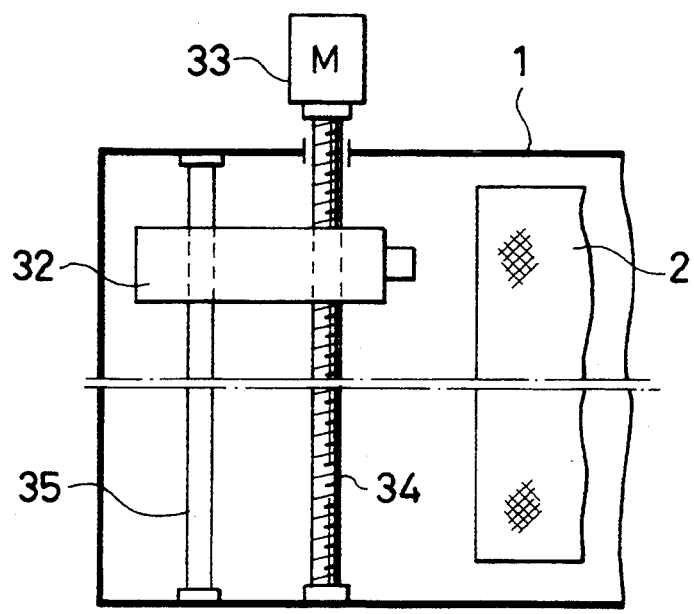
FIG. 5 is a fragmentary cross sectional view showing a continuous filtration device according to a second embodiment of the present invention.

FIG. 5 shows a second embodiment of the present invention, in which a single high pressure spray nozzle 32 that moves in the axial direction of the filter 2 is used instead of the eight high pressure spray nozzles 12 in the first embodiment described above.

As shown in FIG. 5, a feed screw shaft 34 rotationally driven forward and backward by a motor 33 is screw-coupled with the high pressure spray nozzle 32 and a guide rod 35 is penetrated through the nozzle 32. The high pressure spray nozzle 32 is adapted to reciprocate in the axial direction of the filter 2 by the forward and backward rotation of the motor 33.

Other constitutions and functions than those described above are identical with those described in the first embodiment.

By using the high pressure spray nozzle 32, the entire surface in the axial direction of the filter 2 can be cleaned without switching the operation of the nozzles by the solenoid valves 18a, 18b, 18c, 18d.

In both of the embodiments described above, although descriptions have been made to a case in which the high pressure spray nozzles 12, 32 are disposed in the cleaning chamber 21 surrounded with the guide plate 19 and the partition plate 20, the amount of redeposition of the obstacles 22 to the filter 2 can be reduced remarkably without using the partition plate 20 and the intended effect can be expected so long as the obstacles 22 removed and whirled up from the filter 2 are guided by the guide plate 19 in the direction detaching from the filter 2. Accordingly, the partition plate 20 may be saved depending on the case. Further, substantially the same effect as above can be obtained also in a case in which the rotating direction of the filter 2 is reversed to that in the case of FIG. 1.

Further, although descriptions have been made in both of the embodiments to a case in which the liquid filtrate from the discharge pipe 7 is used as the high pressure cleaning liquid 14, the liquid to be filtered from the supply pipe 6 may also be used or both of the liquid filtrate and the liquid to be filtered may be used. In addition, any other liquid than the liquid filtrate or the liquid to be filtered may also be used so long as it is a similar kind of liquid.

Furthermore, in both of the embodiments, descriptions have been made to a case of applying the present invention to a continuous filtration of the marine fuel oils, but it can be applied also to other oils such as lubricants, as well as it can be applied, with similar effects, also to the continuous filtration of various liquids requiring filtration other than the oils.

As has been described above, in accordance with the present invention, since the cleaning liquid at high pressure from the cleaning means is sprayed at an acute angle relative to the surface of the filter to be cleaned, obstacles caught on the surface of the filter can be removed like that they are struck down.

Further, since the obstacles removed and whirled up from the filter can be guided in the direction detaching from the filter by the guide plate which is disposed at a position on the side opposite to the cleaning means with respect to the surface to be cleaned, the amount of the removed obstacles to be redeposited to the filter can be decreased remarkably to obtain a sufficient cleaning effect.

Then, in the present invention, since the cleaning means is disposed within the cleaning chamber defined by circumferentially partitioning the outer chamber with the guide plate and the partition plate, diffusion of the obstacles removed and whirled up from the filter is restricted to the inside of the cleaning chamber, by which the cleaning efficiency can be improved, reduction of the filtration accuracy can be suppressed and the amount of the cleaning liquid to be used can be decreased.

Further, when the cleaning means comprises a plurality of high pressure spray nozzles disposed each at an optional interval in the axial direction of the filter, the entire surface in the axial direction of the filter can be cleaned. In this case, the cleaning liquid at high pressure can be obtained sufficiently by intermittently driving each of the high pressure spray nozzles successively in the axial direction of the filter even when the size of the pressurization means for the cleaning liquid is made smaller, as well as the pressure of the cleaning liquid can be stabilized.

Further, when the cleaning means comprises a high pressure spray nozzle that moves in the axial direction of the filter, the entire surface in the axial direction of the filter can be cleaned even by using a single high pressure spray nozzle.

Further, when the angle made between the cleaning liquid at high pressure sprayed from the cleaning means and the surface of the filter to be cleaned is defined as 20 to 60 degree relative to the tangential line at the surface to be cleaned, the obstacles can be removed most efficiently from the filter.

Further, when the cleaning means is controlled based on the pressure difference between the pressure of the liquid to be filtered and the pressure of the liquid filtrate, the cleaning operation can be automated.

Further, since at least one of the liquid to be filtered and the liquid filtrate is used as the cleaning liquid at high pressure, there is no worry at all that the liquid filtrate suffers from change of property by cleaning.

Furthermore, since the guide plate is installed at an angle of 20 to 60 degree relative to the tangential line at the surface to be cleaned, the obstacles removed from the filter can be guided smoothly to prevent redeposition to the filter more effectively.

As many apparently widely different embodiments of this invention may be made without departing from the spirit and scope thereof, it is to be understood that the invention is not limited to the specific embodiments thereof except as defined in the appended claims.

What is claimed is:

1. A continuous filtration device comprising:
   a cylindrical filter rotationally driven around an axis thereof by a motor,
   said filter having upper and lower ends,
   a filtration tank in which an outer chamber having an inlet for a liquid to be cleaned and an inner chamber having an exit for a liquid filtrate are separated by the filter,
   a cleaning means disposed in the outer chamber for spraying a cleaning liquid at high pressure at an acute angle to a surface of said filter to be cleaned,
   the cleaning means comprising a plurality of high pressure spray nozzles each disposed at a predetermined interval in the axial direction of the filter,
   a plurality of valves, each said valve being connected with at least one of the high pressure spray nozzles,
   a pressurization pump connected to each of said valves for supplying a high pressure cleaning liquid to said high pressure spray nozzles,
   a guide plate disposed at a position opposite to the cleaning means with respect to the surface to be cleaned for guiding obstacles removed by cleaning and detaching them from the filter, a pressure difference gage means for detecting a pressure difference between the inlet for the liquid to be cleaned and the exit for the liquid filtrate, and sequential control means responsive to said gage means for successively opening said plurality of valves for a predetermined period of time when said pressure difference exceeds a predetermined value, wherein said sequential control means opens said valves such that a spray position of high pressure cleaning liquid produced by said high pressure spray nozzles is successively displaced from the upper end to the lower end of said filter.

2. A continuous filtration device as defined in claim 1, wherein the cleaning means is disposed within a cleaning chamber defined by circumferentially partitioning the outer chamber with the guide plate and a partition plate.

3. A continuous filtration device as defined in claim 1, wherein the pressurization pump is connected at its inlet to at least one of the inlet for supplying the liquid to be filtered and the exit for discharging the liquid filtrate.

4. A continuous filtration device as defined in claim 1, wherein the cleaning means directs the cleaning liquid at high pressure to be sprayed at an angle to the surface to be cleaned which is from about 20 to 60 degrees relative to a tangential line at the surface to be cleaned, the guide plate is installed at an angle from about 20 to 60 degrees relative to said tangential line at the surface to be cleaned, and the angle made by the guide plate is slightly smaller than the angle of the cleaning liquid sprayed at high pressure.

* * * * *